United States Patent
Yamada et al.

(10) Patent No.: US 11,899,994 B2
(45) Date of Patent: Feb. 13, 2024

(54) PRINTER SYSTEM

(71) Applicant: SATO HOLDINGS KABUSHIKI KAISHA, Tokyo (JP)

(72) Inventors: Noriyasu Yamada, Tokyo (JP); Shogo Hara, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/084,032

(22) Filed: Dec. 19, 2022

(65) Prior Publication Data

US 2023/0130398 A1 Apr. 27, 2023

Related U.S. Application Data

(63) Continuation of application No. PCT/JP2021/030710, filed on Aug. 23, 2021.

(30) Foreign Application Priority Data

Aug. 25, 2020 (JP) .................. 2020-141588

(51) Int. Cl.
*G06F 3/12* (2006.01)

(52) U.S. Cl.
CPC .......... *G06F 3/1232* (2013.01); *G06F 3/1203* (2013.01); *G06F 3/1253* (2013.01)

(58) Field of Classification Search
CPC .... G06F 3/1232; G06F 3/1203; G06F 3/1253; G06F 3/12; G06F 3/1204; G06F 3/1222; G06F 3/1238; G06F 3/1288; G06F 3/1292; B41J 29/38; G16Y 20/10
See application file for complete search history.

(56) References Cited

U.S. PATENT DOCUMENTS

| | | | |
|---|---|---|---|
| 2004/0212824 A1* | 10/2004 | Ohara | G06F 3/1288 358/1.15 |
| 2015/0092215 A1* | 4/2015 | Hara | H04N 1/32539 358/1.13 |
| 2017/0075635 A1* | 3/2017 | Maemura | G06F 3/1285 |

FOREIGN PATENT DOCUMENTS

| | | |
|---|---|---|
| JP | 2008-305345 A | 12/2008 |
| JP | 2009-049481 A | 3/2009 |
| JP | 2012-076393 A | 4/2012 |
| JP | 2017-011660 A | 1/2017 |
| JP | 2018-063513 A | 4/2018 |

OTHER PUBLICATIONS

International Search Report and Written Opinion issued in connection with PCT Appl. Ser. No. PCT/JP2021/030710 dated Nov. 22, 2021.

* cited by examiner

*Primary Examiner* — Iriana Cruz
(74) *Attorney, Agent, or Firm* — Foley & Lardner LLP

(57) ABSTRACT

A printer system includes a management server that acquires position information of a printer and identifies a role of the printer set for the position of the printer based on the acquired position information, and the printer that acquires information associated with a role of the printer identified by the management server and operates based on the acquired information. The printer may update printer settings based on setting data acquired from the management server. The printer may acquire print data stored in a storage location identified by the management server and perform printing based on the acquired print data.

18 Claims, 7 Drawing Sheets

| IDENTIFIER | | RANGE INFORMATION | | ROLE INFORMATION | |
|---|---|---|---|---|---|
| FACILITY ID | AREA ID | HORIZONTAL | HEIGHT | ROLE ID | REMARKS |
| XXXX | 101 | (X1,Y1)··· | Z1 | 010000A | STORE A |
| XXXX | 102 | (X2,Y2)··· | Z1 | 010000B | STORE B |
| XXXX | 103 | (X3,Y3)··· | Z1 | 0200001 | INFORMATION CENTER |
| XXXX | 104 | (X4,Y4)··· | Z1 | 010000C | STORE C |
| XXXX | 104a | (X4a,Y4a)··· | Z1 | 010000Ca | - SALES SPACE |
| XXXX | 104b | (X4b,Y4b)··· | Z1 | 010000Cb | - CASH REGISTER |
| XXXX | 104c | (X4c,Y4c)··· | Z1 | 010000Cc | - FITTING ROOM |
| XXXX | 104d | (X4d,Y4d)··· | Z1d | 010000Cd | - LOWER PART OF WAREHOUSE |
| XXXX | 104e | (X4e,Y4e)··· | Z1e | 010000Ce | - UPPER PART OF WAREHOUSE |
| ⋮ | ⋮ | ⋮ | ⋮ | ⋮ | |
| XXXX | 107 | (X7,Y7)··· | Z1 | 010000D | STORE D |
| XXXX | 201 | (X8,Y8)··· | Z2 | 010000E | STORE E |
| XXXX | 202 | (X9,Y9)··· | Z2 | 010000F | STORE F |
| XXXX | 203 | (X10,Y10)··· | Z2 | 010000G | STORE G |
| XXXX | 204 | (X11,Y11)··· | Z2 | 010000H | STORE H |
| ⋮ | ⋮ | ⋮ | ⋮ | ⋮ | ⋮ |

FIG.3

| IDENTIFIER | | RANGE INFORMATION | | ROLE INFORMATION | |
|---|---|---|---|---|---|
| FACILITY ID | AREA ID | HORIZONTAL | HEIGHT | ROLE ID | REMARKS |
| XXXX | 101 | (X1,Y1)⋯ | Z1 | 010000A | STORE A |
| XXXX | 102 | (X2,Y2)⋯ | Z1 | 010000B | STORE B |
| XXXX | 103 | (X3,Y3)⋯ | Z1 | 0200001 | INFORMATION CENTER |
| XXXX | 104 | (X4,Y4)⋯ | Z1 | 010000C | STORE C |
| XXXX | 104a | (X4a,Y4a)⋯ | Z1 | 010000Ca | – SALES SPACE |
| XXXX | 104b | (X4b,Y4b)⋯ | Z1 | 010000Cb | – CASH REGISTER |
| XXXX | 104c | (X4c,Y4c)⋯ | Z1 | 010000Cc | – FITTING ROOM |
| XXXX | 104d | (X4d,Y4d)⋯ | Z1d | 010000Cd | – LOWER PART OF WAREHOUSE |
| XXXX | 104e | (X4e,Y4e)⋯ | Z1e | 010000Ce | – UPPER PART OF WAREHOUSE |
| ⋮ | ⋮ | ⋮ | ⋮ | ⋮ | ⋮ |
| XXXX | 107 | (X7,Y7)⋯ | Z1 | 010000D | STORE D |
| XXXX | 201 | (X8,Y8)⋯ | Z2 | 010000E | STORE E |
| XXXX | 202 | (X9,Y9)⋯ | Z2 | 010000F | STORE F |
| XXXX | 203 | (X10,Y10)⋯ | Z2 | 010000G | STORE G |
| XXXX | 204 | (X11,Y11)⋯ | Z2 | 010000H | STORE H |
| ⋮ | ⋮ | ⋮ | ⋮ | ⋮ | ⋮ |

UPDATING TO "STORE A"
PLEASE WAIT A WHILE.

PRINTER SYSTEM

RELATED APPLICATION

This application is a bypass continuation of International Patent Application No. PCT/JP2021/030710, filed on Aug. 23, 2021, and claims priority to Japanese Patent Application No. 2020-141588, filed on Aug. 25, 2020. The entire contents of these applications are incorporated herein by reference.

BACKGROUND

1. Field of the Invention

The present invention relates to a printer system.

2. Description of the Related Art

In retail stores or other stores, printers for issuing product labels, which display product names, prices, bar codes, and the like, or for issuing receipts or coupons for customers are used. The content to be printed by a printer may be acquired from a server via a network. The configuration information, including the address of a server from which the content to be printed is acquired, is rewritten by connecting a personal computer or a dedicated device to the printer (see, for example, JP2012-076393A).

SUMMARY OF THE DISCLOSURE

In order to use a printer in a store, it is necessary to set up the printer in advance for the store. In the case of a facility that houses a number of stores, such as a department store and a shopping mall, it is necessary to manage which printer is used in each store with regard to a number of printers used in the whole facility and to make settings of each printer appropriately for the store where the printer is used. To change printer settings, a specialized engineer may be required. Even when such an engineer is unavailable, it is preferable to respond promptly and easily to the need of, for example, adding a printer in haste in a store where customers have suddenly increased or immediately replacing a failed printer.

An illustrative purpose of one embodiment of the present invention is to provide a technology for easily changing the role of a printer.

A printer system according to one embodiment of the present invention includes: a server that acquires position information of a printer and identifies a printer's role set for the position of the printer based on the acquired position information; and a printer that acquires information associated with a printer's role identified by the server and operates based on the acquired information.

Another embodiment of the present invention relates to a non-transitory program recording medium comprising a program. The program causes a computer to implement: acquiring position information of a printer; identifying a printer's role set for the position of the printer based on the acquired position information; and transmitting information associated with the identified printer's role to the printer.

BRIEF DESCRIPTION OF DRAWINGS

Embodiments will now be described by way of examples only, with reference to the accompanying drawings which are meant to be exemplary, not limiting and wherein like elements are numbered alike in several Figures in which:

FIG. 3 is a table that shows an example of area information:

DETAILED DESCRIPTION

Figure 1:
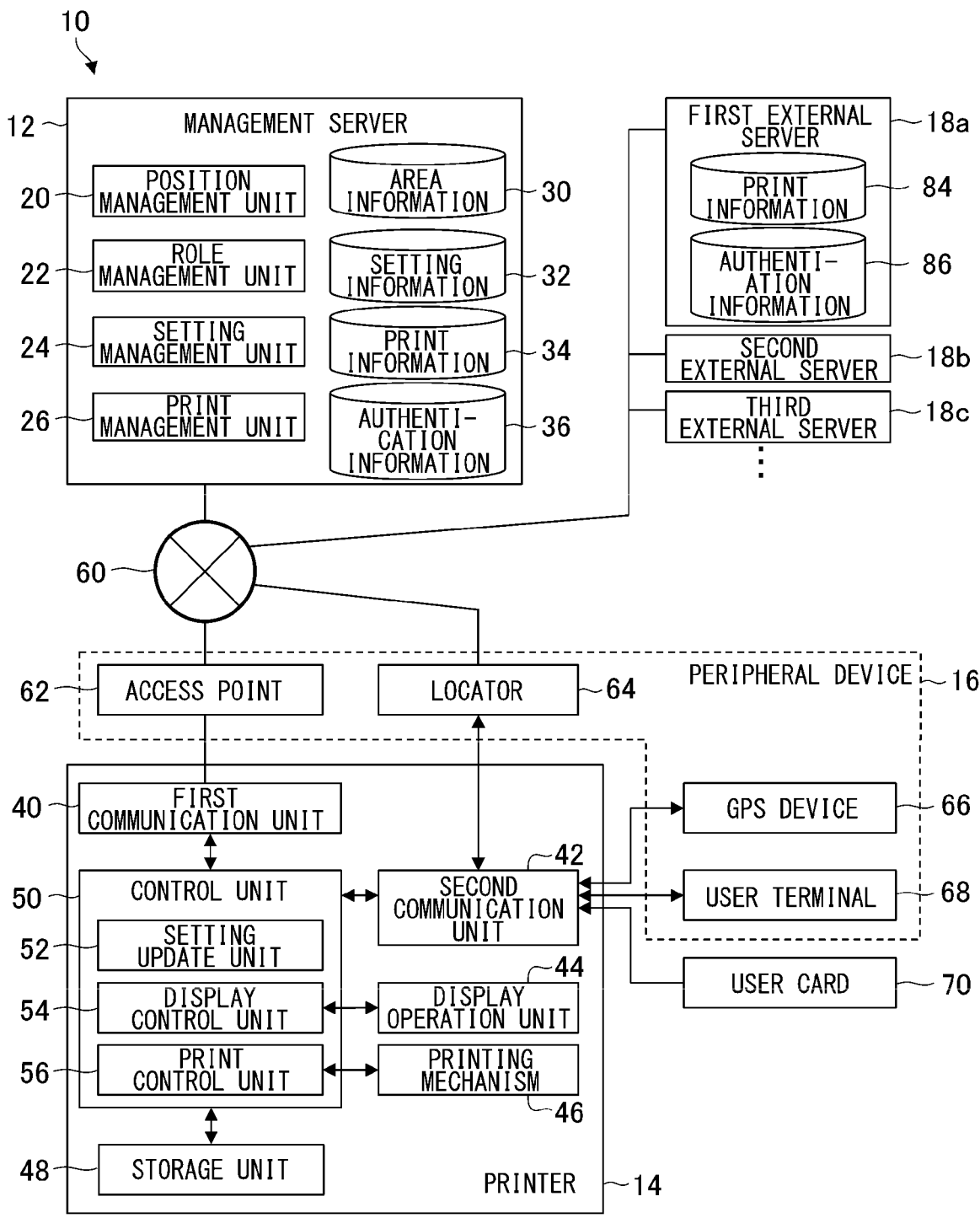
FIG. 1 is a block diagram that schematically shows a functional configuration of a printer system according to an embodiment.

In the following, an embodiment for carrying out the present invention will be described in detail with reference to the drawings. Like reference characters denote like elements in the description, and repetitive description will be omitted as appropriate.

An overview of the present embodiment will be described. The present embodiment relates to a printer system that includes a server and a printer. The server acquires position information of the printer and identifies a printer's role set for the position of the printer based on the position information thus acquired. The printer acquires information associated with the printer's role identified by the server and operates based on the information thus acquired. According to the present embodiment, simply by bringing a printer to a location where the printer is to be used, the printer settings are automatically updated, and the printer is set to perform a role set for the location. For example, in a facility where a number of printers are used, it is no longer necessary to determine the installation location for each printer or make initial settings for each printer in advance based on the installation location. Also, if the number of printers used in a particular location needs to be temporarily increased or if a failed printer needs to be replaced, by simply bringing another printer from another location, the settings can be automatically changed. As a result, printers can be flexibly operated in various locations, and printer sharing can be realized such that a limited number of printers can be used in various locations, as needed and when needed.

The printer system according to the present embodiment can be used in large-scale commercial facilities, such as department stores and shopping malls. In a commercial facility, multiple stores are provided on each floor of a building. In each store, a printer is used to issue receipts and coupons or to issue product labels. Since the content to be printed by a printer is different for each store, the printer needs to be set up for each store. Also, even in the same store, a printer installed at a cash register to issue receipts and a printer installed in a backroom, where the stock of products is stored, to issue product labels may differ in terms of the printing paper or the content to be printed, so that the printer settings need to be changed depending on the use. In the present embodiment, the role of each of such printers can be automatically updated based on the location where the printer is used.

In the present embodiment, the "role" of a printer is defined based on the user or the use of the printer. When the role of a printer is changed, a specific function to be provided by the printer is also changed. When a printer is used in a commercial facility, the printer's role can be defined with a user name, such as the name of the commercial facility or store, and the use in the facility or store. The use of a printer can be defined as sales floor use, cash register use, warehouse use, and the like. For example, a printer assigned the role for cash register use in a store A, which deals in clothing, may be configured to provide the function to issue receipts and coupons, printed with the logo of the store A and information on a product of the store A. Upon acquisition of information associated with the role, the printer can provide a function corresponding to the role. The information associated with the role as used herein means arbitrary data used by the printer to provide a function corresponding to the role, and the information includes the setting data and print data of the printer, and a command and a program to be executed by the printer.

The printer system according to the present embodiment can also be used in other than commercial facilities and is applicable to printers used in various facilities, such as offices, office buildings, factories, warehouses, medical institutions, educational institutions, and public offices. When a printer is used in such a facility, the printer's role can be defined with the user name, such as the corporate name, company name, organization name, facility name, department name, or division name, and the use of the printer. For example, when a printer is used in a factory or warehouse, the use of the printer can be defined as received product use, product inspection use, sorting use, manufacturing management use, inspection use, shipping product use, and the like.

In the following, the present embodiment will be detailed with an example describing use in a commercial facility.

FIG. 1 is a block diagram that schematically shows a functional configuration of a printer system 10 according to an embodiment. Each functional block shown in the present embodiment can be implemented by an element such as a CPU or memory of a computer or by a mechanism in terms of hardware, and by a computer program or the like in terms of software. FIG. 1 illustrates functional blocks implemented by coordination of those components. Therefore, it will be understood by those skilled in the art that these functional blocks may be implemented in a variety of forms by combinations of hardware and software.

The printer system 10 includes a management server 12 and a printer 14. The management server 12 is configured to identify the role of the printer 14 based on the position of the printer 14. The printer 14 operates to perform the role identified by the management server 12. The management server 12 and the printer 14 are connected to a network 60 such as the Internet. To the network 60, a peripheral device 16 and multiple external servers 18a, 18b, and 18c are also connected. Before the configurations of the management server 12 and the printer 14 are described in detail, the peripheral device 16 and the external servers 18a-18c will be described.

The peripheral device 16 is a device present around the printer 14 and functions as a positioning device for measuring the position of the printer 14. The peripheral device 16 may be an access point 62, a locator 64, a GPS device 66, or a user terminal 68, for example.

The access point 62 is a wireless base station used for wireless communication in accordance with a standard such as Wi-Fi (registered trademark). The access point 62 is installed on a wall or ceiling of a facility where the printer 14 is used, and the access point 62 is used to connect the printer 14 to the network 60. The access point 62 can be used to identify the position of the printer 14 using a positioning technology based on a Wi-Fi signal. For example, by measuring the radio wave strength of a Wi-Fi signal or measuring the propagation time of the Wi-Fi signal using the Time of Flight (TOF) method, the distance between the printer 14 and the access point 62 can be measured. Further, by measuring the distance between the printer 14 and each of multiple access points 62 present around the printer 14, the position of the printer 14 can be identified based on the principle of triangulation. The position of an access point 62 that can be connected to the printer 14 may be considered as the position of the printer 14.

The locator 64 is a device for identifying the position of the printer 14 using a beacon signal transmitted and received in accordance with a standard such as Bluetooth (registered trademark). The locator 64 is installed on a wall or ceiling of a facility where the printer 14 is used. The locator 64 measures the Angle of Arrival (AOA) of a beacon signal transmitted from the printer 14, for example, to identify the position of the printer 14 based on the AOA thus obtained. Also, the locator 64 may transmit a beacon signal, and the printer 14 may then receive the beacon signal to identify its own position. Also, the printer 14 may identify its own position based on beacon signals transmitted from multiple locators 64.

The GPS device 66 receives a positioning signal from a satellite positioning system, such as the Global Positioning System (GPS) and the Global Navigation Satellite Systems (GNSS), to identify its own position. The printer 14 acquires position information from a GPS device 66 present around the printer 14 and uses the position of the GPS device 66 as the printer's own position. The GPS device 66 may be connected to the network 60 and may transmit the position information of the printer 14 to the management server 12. The GPS device 66 may also be connected to the printer 14 by wired means or may be built into the printer 14.

The user terminal 68 is a portable terminal, such as a smartphone or a tablet terminal. The user terminal 68 acquires its own position information using an arbitrary method. The user terminal 68 may identify the position using a Wi-Fi signal transmitted to or received from the access point 62, may identify the position using a beacon signal transmitted to or received from the locator 64, or may identify the position using the GPS function. The printer 14 acquires position information from a user terminal 68 present around the printer 14 and uses the position of the user terminal 68 as the printer's own position. Also, the user terminal 68 may transmit the position information of the printer 14 to the management server 12.

The method of identifying the position of the printer 14 is not limited to the methods described above, and other arbitrary methods may be used. Also, as the peripheral device 16, another arbitrary positioning device, not illustrated, may be used. Further, the position of the printer 14 may be identified by combining multiple methods and may be identified with high accuracy by comprehensively using the position information identified by the abovementioned methods or other methods.

The external servers 18a-18c are servers prepared separately from the management server 12. Also, the external servers 18a-18c are dedicated servers prepared for the respective users of the printer 14 and prepared respectively for stores or companies operating multiple stores. For example, a first external server 18a is a dedicated server for a store A and retains print information 84 and authentication information 86 used when the printer 14 is used in the store A. A second external server 18*b* is a dedicated server for a store B, for example, and retains print information and authentication information used when the printer 14 is used in the store B. A third external server 18*c* is a dedicated server for a company operating a store C and a store D, for example, and retains print information and authentication information used when the printer 14 is used in the store C or store D. The number of external servers used in the printer system 10 is not particularly limited, and external servers may be prepared considering the number of organizations or departments using the printer system 10. Also, the printer system 10 may be configured to not use the external servers 18*a*-18*c*.

There will now be described the functional configuration of the management server 12. The management server 12 includes a position management unit 20, a role management unit 22, a setting management unit 24, and a print management unit 26. The management server 12 stores area information 30, setting information 32, print information 34, and authentication information 36.

The position management unit 20 acquires the position information of the printer 14 to find the current position of the printer 14. The position management unit 20 acquires the position information of the printer 14 from the printer 14 or the peripheral device 16 via the network 60 and identifies the three-dimensional coordinates (such as the longitude, latitude, and altitude) of the printer 14. The position management unit 20 may specify the accuracy of the position of the printer 14 and may also specify the error range of the position of the printer 14 or a range in which the printer 14 may be located. The position management unit 20 continuously acquires the position information of the printer 14 and tracks changes in the position of the printer 14.

The role management unit 22 identifies the role of the printer 14 based on the position information of the printer 14. The role management unit 22 uses the area information 30 to identify the role set for the position of the printer 14 identified by the position management unit 20. The area information 30 defines an identifier for identifying each area, range information for specifying the range of each area, and role information indicating the role of the printer 14 in each area.

Figure 2:
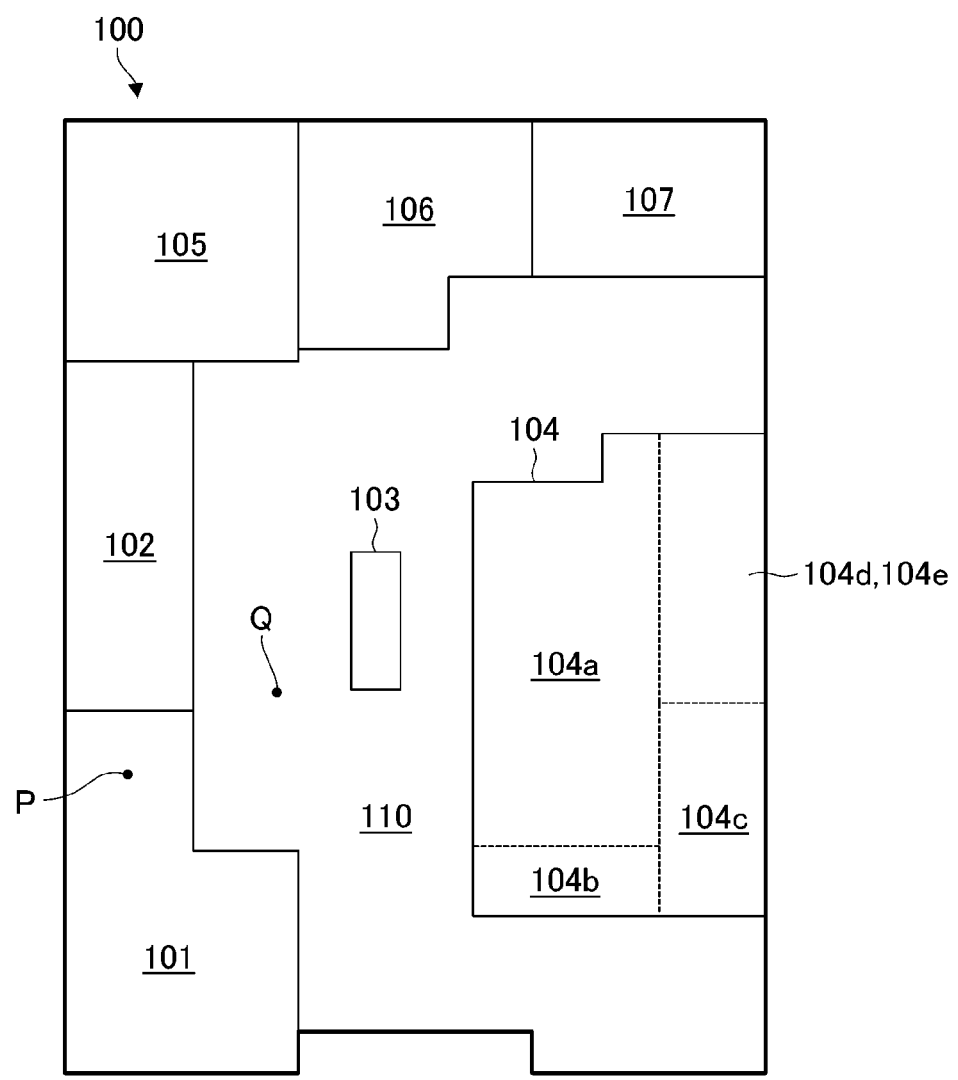
FIG. 2 is a diagram that schematically shows an example of area setting.

FIG. 2 is a diagram that schematically shows an example of area setting and illustrates an example of arrangement of multiple areas 101-107 set on a first floor 100 of a commercial facility. The range of each of the multiple areas 101-107 corresponds to a range occupied by a store or booth provided in the area. The position, shape, and size of each of the areas 101-107 may vary. For example, a first area 101 is a store A, which is a drugstore, and a second area 102 is a store B that deals in miscellaneous goods. Also, a third area 103 is an information center of the commercial facility, and a fourth area 104 is a store C that deals in clothing. A region 110 where the area 101-107 are not set corresponds to a place where there are no stores or booths, such as a passageway.

When the commercial facility has multiple floors (levels), areas can be set for each floor. Accordingly, the range of an area can be set not only in a horizontal direction but also in a height direction. The multiple areas set on a floor can be different for each floor. For example, the multiple areas 101-107 set on the first floor 100 may differ in position, shape, and size from the multiple areas set on the second floor.

In an area, sub-areas may be set. Sub-areas are set in a range that overlaps with an area. In the example of FIG. 2, multiple sub-areas 104*a*-104*e* are set within the fourth area 104. For example, a first sub-area 104*a* is a sales space where products are displayed, a second sub-area 104*b* is a checkout area provided with a cash register terminal, and a third sub-area 104*c* is a fitting room. A fourth sub-area 104*d* and a fifth sub-area 104*e* constitute a warehouse (backroom) for storing the stock of products. The fourth sub-area 104*d* and fifth sub-area 104*e* are divided in a height direction. For example, the fourth sub-area 104*d* corresponds to a lower storage shelf in the warehouse, and the fifth sub-area 104*e* corresponds to an upper storage shelf in the warehouse. Thus, the range of a sub-area can also be set not only in a horizontal direction but also in a height direction.

FIG. 3 is a table that shows an example of the area information 30 corresponding to the area setting in FIG. 2. The area information 30 includes the identifier, the range information, and the role information. As the identifier in the area information 30, a combination of a facility ID and an area ID is used. The facility ID is an identifier for identifying a facility or building in which multiple areas are set. The area ID is an identifier for identifying each of multiple areas set within a facility. For example, to the multiple areas 101-107 set on the first floor, area numbers 101-107 are assigned. Also, to the multiple areas set on the second floor, area numbers 201-204 are assigned. Further, to the multiple sub-areas 104*a*-104*e*, area numbers 104*a*-104*e* are assigned.

The range information defines coordinates specifying the three-dimensional range of each area. The range of each area is defined as a box-like space: the horizontal range defines a planar shape corresponding to the bottom surface of the box, and the height range defines the height of the box. In the example of FIG. 3, the longitude (X-coordinate) and the latitude (Y-coordinate), which specify the horizontal range, and the altitude (Z-coordinate), which specifies the height range, are set separately. Thus, the area information includes height information, and the printer's role can be defined for each height.

The horizontal range of each area is defined, for example, by sequentially specifying the coordinates (X, Y) of multiple vertices of a polygon that defines the periphery of the area. For example, for a rectangular area, the longitude and the latitude of each of the four vertices are set. The method of setting the horizontal range of an area is not particularly limited, and an arbitrary method may be used. For example, the horizontal range may be defined by the center coordinates (X, Y) of the area, and the distances (Lx, Ly) in longitude and latitude directions from the center coordinates.

The height range of an area is defined, for example, by an altitude Z above sea level, and a standard height at which the printer 14 is used, such as about 1 m from the floor, is set for each floor. For example, for the first floor, an altitude Z1 is set, and for the second floor, an altitude Z2 is set. For the sub-areas 104*d* and 104*e* divided in a height direction, individual altitudes Z1*d* and Z1*e* corresponding to the heights of the respective sub-areas are set. The method of setting the height range of an area is not particularly limited, and an arbitrary method may be used. For example, the height range may be defined by lower and upper limits of the altitude of each area, such as by the altitude of the floor surface and the altitude of the ceiling.

The role information defines a role ID that identifies the role of the printer 14 set for each area. For example, for the first area 101, the role ID of the store A is set, and, for the second area 102, the role ID of the store B is set. For the third area 103, the role ID of the information center of the commercial facility is set. For the fourth area 104, the role ID of the store C is set, and, for the sub-areas 104*a*-104*e* in the fourth area, role IDs corresponding to the individual uses in the store C are set. In FIG. 3, a remarks column is provided to describe the meaning of each role ID, for the sake of clarity; however, the remarks column may not be provided as the role information.

The area information 30 may be defined in stages by multiple tables. The area information 30 may have a three-level data structure constituted by a facility table, an area table, and a sub-area table, for example. The facility table may contain facility IDs available for the printer 14, and the position coordinates of the facilities. The area table may be created for each facility and may contain multiple area IDs set within the facility, and the range information and the role information of each area. The sub-area table may be created for each area and may contain multiple sub-area IDs set within the area, and the range information and the role information of each sub-area.

The role management unit 22 refers to the area information 30 to identify the area corresponding to the position of the printer 14. The role management unit 22 searches the range information based on the position of the printer 14 to identify the area that includes the position of the printer 14. For example, if the position of the printer 14 is a point P, the role management unit 22 identifies the first area 101 that includes the point P. If no area is set for the position of the printer 14, such as when the printer 14 is located at the point Q in FIG. 2, the role management unit 22 may judge that no area is set.

The role management unit 22 may identify multiple areas where the printer 14 may be located. When the positional accuracy of the printer 14 is low, for example, multiple areas that overlap with an error range centered on the position of the printer 14 may be identified as candidate areas. For example, when the printer 14 is located at the point P included in the first area 101 in FIG. 2, the first area 101 and the second area 102 located around the first area 101 may be identified as candidate areas. Also, when the printer 14 is located at the point Q in FIG. 2, the first area 101, the second area 102, and the third area 103 that are located around the point Q may be identified as candidate areas.

The role management unit 22 refers to the area information 30 to identify the role of the printer 14 set for the identified area. Upon judging that the printer 14 is located in the first area 101, the role management unit 22 identifies, as the role of the printer 14, "STORE A" set for the first area 101. Upon judging that the printer 14 is located in the sub-area 104*b* within the fourth area 104, the role management unit 22 identifies, as the role of the printer 14, "CASH REGISTER IN STORE C" set for the sub-area 104*b*. Also, when multiple candidate areas are identified, the role management unit 22 may identify multiple roles set for the multiple candidate areas, as candidates for the role of the printer 14.

The role management unit 22 also identifies the height at which the printer 14 is located and identifies the printer's role set for the height thus identified. Based on the height at which the printer 14 is located, the role management unit 22 may identify the floor and the area where the printer 14 is disposed. For example, whether the printer 14 is disposed in the multiple areas 101-107 set on the first floor 100 or in the multiple areas 201-204 set on the second floor may be judged. Based on the height at which the printer 14 is located, the role management unit 22 may identify the sub-area where the printer 14 is located. For example, whether the printer 14 is located in the fourth sub-area 104*d* or the fifth sub-area 104*e* within the fourth area 104 may be judged.

The role management unit 22 may identify the printer's role based on user information acquired from the printer 14. The "user information" as used herein is information used to identify an organization that uses the printer 14, such as a store or company, or information used to identify an individual who operates the printer 14, such as an employee of a store or company. The role management unit 22 may refer to the authentication information 36, in which role IDs and user IDs are related to each other, to identify the role set for the user information acquired from the printer 14. The authentication information 36 defines, for each role ID, a user ID for which the role ID is available, for example. Instead of the authentication information 36 provided in the management server 12, the authentication information 86 provided in one of the external servers 18*a*-18*c* may be used. The authentication information 86 stored on the external servers 18*a*-18*c* defines, for example, a user ID for which a specific role ID is available. When multiple roles set for multiple areas are identified as candidates for the role of the printer 14, the role management unit 22 may narrow the multiple roles down to one based on the user information. When no area is set for the position of the printer 14 and the role of the printer 14 is unclear, the role management unit 22 may identify the role of the printer 14 based on the user information.

When the position of the printer 14 has changed, the role management unit 22 detects whether or not the area where the printer 14 is located has changed and also detects whether or not the role of the printer 14 has changed because of the area change. The role management unit 22 may retain history information of the area where the printer 14 has been located or of the role of the printer 14. With reference to the history information, the role management unit 22 may detect whether or not the area corresponding to the current position of the printer 14 or the role of the printer 14 has been changed. The role management unit 22 may also retain history information of the user information of the printer 14 and may detect a change in the user of the printer 14. Upon detection of a user change, the role management unit 22 may detect a change in the role of the printer 14.

The setting management unit 24 transmits, to the printer 14, setting data associated with the role of the printer 14 identified by the role management unit 22. The setting data includes a setting command for updating the settings of the printer 14, image data to be displayed on the screen of the printer 14, and an application program to be executed on the printer 14, for example. The setting command is provided to set up the printing operation of the printer 14, including the printing speed, printing density, printing paper, and printing mode. The printing modes include a continuous issuing mode, a peeling issuing mode, and a tear-off mode. The image data may be a store or company logo image, for example, and is displayed on the start screen or menu screen of the printer 14. The application program is a program for executing, on the printer 14, an application for editing the content to be printed, for example. These setting data are usually different for each role, such as each store or each use.

The setting data are prepared in advance as the setting information 32 for each role of the printer 14. The setting information 32 includes, for example, multiple setting data associated with multiple role IDs. The setting information 32 may include parameter information used to generate setting data associated with a role. Based on a parameter defined in the setting information 32, the setting management unit 24 may generate the setting data associated with a role and transmit the setting data to the printer 14. The setting management unit 24 may also transmit the setting data to the printer 14 based on a request from the printer 14.

Upon detection of a change in the area or role by the role management unit 22, the setting management unit 24 may transmit to the printer 14 the setting data associated with the role after the change. The setting data may include an instruction (a command) for enabling operation corresponding to the role of the printer 14 after the change. Based on the received setting data, the printer 14 may update the settings of the printer 14 to perform a function corresponding to the role after the change. The setting data may include a command for disabling operation corresponding to the role of the printer 14 before the change. For example, when no area is set for the position of the printer 14 and the role of the printer 14 is unclear, operation corresponding to a specific role of the printer 14 may be disabled. Upon reception of the setting data, the printer 14 may delete the setting data associated with the role before the change, so as to be unable to perform the function corresponding to the role before the change. Instead of deleting the setting data associated with the role before the change, the printer 14 may be placed in a state of being unable to perform menu operation for performing the function corresponding to the role before the change.

When multiple roles are identified as candidates by the role management unit 22, the setting management unit 24 may transmit multiple pieces of information associated with the multiple roles to the printer 14. In this case, one of the multiple roles may be selected by operating the printer 14. Based on a request from the printer 14, the setting management unit 24 may transmit to the printer 14 the setting data associated with the selected role. The setting management unit 24 may collectively transmit multiple setting data associated with multiple roles to the printer 14. In this case, the printer 14 may be configured to store the multiple setting data and switch between the multiple roles in response to operations on the printer 14.

Based on the user information acquired from the printer 14 and the authentication information 36 or authentication information 86, the setting management unit 24 may judge whether or not the user can use a specific role of the printer 14. When the setting management unit 24 has judged that the user can use the specific role of the printer 14, the setting management unit 24 may transmit, to the printer 14, an instruction for enabling operation of the printer 14. When the setting management unit 24 has judged that the user cannot use the specific role of the printer 14, the setting management unit 24 may transmit to the printer 14 an instruction for disabling operation of the printer 14.

The print management unit 26 allows the printer 14 to acquire print data associated with the role of the printer 14 identified by the role management unit 22. The print data includes character data, character font data, image data such as logos, rendering data for one-dimensional or two-dimensional codes, and template data that defines the arrangement of characters and images to be printed. The user of the printer 14 may edit the content to be printed, on an application running on the printer 14. The editing of the content to be printed is performed, for example, by selecting a template, entering text to be inserted into the template, selecting images to be inserted into the template, and determining the arrangement. With such editing of the content to be printed, the final version of the content to be printed is determined, and printing processing is performed using the print data. These print data also are usually different for each role, such as each store or each use.

The print management unit 26 may generate the print data based on the print information 34 stored on the management server 12 and transmit the print data to the printer 14. The print information 34 may include multiple print data associated with multiple role IDs. The print information 34 may include parameter information used to generate print data associated with a role. Based on a parameter defined in the print information 34, the print management unit 26 may generate the print data associated with a role and transmit the print data to the printer 14.

The print management unit 26 may transmit, to the printer 14, the print data associated with the role of the printer 14 together with the setting data. The print management unit 26 may also transmit the print data to the printer 14 upon request from the printer 14. For example, when editorial work or printing processing is to be performed using the printer 14, print data necessary for the printing processing may be transmitted to the printer 14 based on a request from the printer 14. The print data may be data corresponding to the final version of the content to be printed and may be data in the form of characters, images, bar codes, and the like embedded in a template.

The print management unit 26 may acquire print data based on the print information 84 provided in one of the external servers 18a-18c and transmit the print data to the printer 14. The print data is prepared for each store or company and may be stored on the external servers 18a-18c. The print management unit 26 may transmit, to the printer 14, information specifying a storage location of the print data so that the printer 14 can acquire the print data from the storage location thus specified. The storage location of the print data may be the management server 12 or any of the external servers 18a-18c.

The storage location of the print data may differ depending on the role. For example, the print data for the store A may be stored on the first external server 18a, and the print data for a store E may be stored on the management server 12. In this case, the print management unit 26 identifies the storage location of the print data based on the role of the printer 14. The printer 14 acquires the print data stored in the storage location thus identified. The printer 14 may directly access the storage location to acquire the print data. Instead of the printer 14 directly acquiring the print data, the print management unit 26 may acquire the print data from the storage location and transmit the print data to the printer 14.

There will now be described the functional configuration of the printer 14. The printer 14 includes a first communication unit 40, a second communication unit 42, a display operation unit 44, a printing mechanism 46, a storage unit 48, and a control unit 50.

The first communication unit 40 is a communication interface for connection with the management server 12 or the external servers 18a-18c via the network 60. The first communication unit 40 is configured, for example, to wirelessly connect with the access point 62. The first communication unit 40 may also be configured to connect to the network 60 by wired means.

The second communication unit 42 is a communication interface for short-range communication with the peripheral device 16. The second communication unit 42 may wirelessly connect with the locator 64, the GPS device 66, and the user terminal 68, for example, via Bluetooth to acquire the position information. The second communication unit 42 may also wirelessly connect with the user terminal 68 or a user card 70 via Near field communication (NFC) to acquire the position information and user information. The printer 14 may be connected with a bar code reader (not illustrated) and acquire user information read by the bar code reader.

The display operation unit 44 is constituted by a touch panel display and enables screen display and input operation for operating the printer 14. The display operation unit 44 may be configured to include a display unit and an operation unit separately, and the operation unit constituted by buttons and switches may be disposed around the display unit constituted by a liquid crystal display or the like. The display operation unit 44 may also include a microphone for receiving voice input operations from a user, or a camera for receiving input operations by means of gestures from a user.

The printing mechanism 46 performs printing on paper, such as label paper. The printing mechanism 46 includes an advancing mechanism for advancing paper, and a printing head for printing characters and images on the paper. The printing mechanism 46 may also include a peeling mechanism for peeling off a label printed with characters or images from the backing sheet, and a cutting mechanism for cutting the printed labels into predetermined size.

The storage unit 48 stores data acquired by the printer 14. The storage unit 48 stores setting data and print data associated with a role. The storage unit 48 is constituted by a semiconductor storage device such as a flash memory, or a magnetic storage device such as a hard disk.

The control unit 50 controls the overall operation of the printer 14. The control unit 50 acquires information from the management server 12 and controls the operation of the printer 14 based on the information thus acquired. The control unit 50 acquires information associated with a role identified by the management server 12 so that the printer 14 can provide a function corresponding to the specific role. The control unit 50 includes a setting update unit 52, a display control unit 54, and a print control unit 56.

The setting update unit 52 acquires setting data from the management server 12 and updates the settings of the printer 14 based on the setting data thus acquired. The setting update unit 52 updates the printer settings based on the setting data associated with a specific role acquired from the management server 12 so that the printer 14 can provide a function corresponding to the specific role. The setting update unit 52 updates a logo image or menu displayed on the display operation unit 44 based on the setting data and also updates operating parameters, such as the printing speed, printing density, and printing mode of the printing mechanism 46. The setting update unit 52 installs an application program based on the setting data and makes the application available through the display operation unit 44.

The setting update unit 52 may transmit, to the management server 12, a command for requesting setting data. The setting update unit 52 may transmit the command to the management server 12 upon power-on or restart of the printer 14. When the setting update unit 52 has acquired the position information of the printer 14 from the peripheral device 16, the setting update unit 52 may transmit the command to the management server 12 upon acquisition of the position information. The setting update unit 52 may transmit to the management server 12 the acquired position information together with the command. When the setting update unit 52 has acquired the user information from the user terminal 68 or the user card 70, the setting update unit 52 may transmit the command to the management server 12 upon acquisition of the user information. With the command transmitted by the setting update unit 52, the management server 12 can be notified of the timing at which the latest setting data is required, so that the setting data associated with the role set for the current position of the printer 14 can be promptly acquired.

The setting update unit 52 may store multiple setting data associated with multiple roles in the storage unit 48 and switch the printer settings in response to an operation for selecting one of the multiple roles. For example, setting data associated with a role before update and setting data associated with a role after the update may be stored in the storage unit 48 and, upon a user's operation, the printer settings may be updated. When multiple pieces of information associated with multiple roles are transmitted from the management server 12, the setting update unit 52 may store the multiple pieces of information in the storage unit 48 and update the printer settings in response to an operation for selecting one of the multiple roles. When the setting update unit 52 has updated the printer settings, the setting update unit 52 may delete the setting data before the update from the storage unit 48 or may leave the setting data in the storage unit 48.

Based on a command received from the management server 12, the setting update unit 52 may enable or disable operation corresponding to a specific role. The setting update unit 52 may enable operation corresponding to a specific role by updating the printer settings and may disable operation corresponding to a specific role by deleting and initializing the printer settings. The setting update unit 52 may also enable or disable operation corresponding to a specific role without changing the printer settings. For example, by changing the settings of the menu screen through the display operation unit 44, the states where operation corresponding to a specific role is enabled and disabled may be switched.

The setting update unit 52 acquires print data associated with a set role and stores the print data in the storage unit 48. The setting update unit 52 may transmit a command for requesting the print data to the management server 12 so as to allow the management server 12 to transmit the print data. The setting update unit 52 may also transmit to the management server 12 a command for requesting information indicating the storage location of the print data. The setting update unit 52 may access the storage location specified by the management server 12 to acquire the print data. The setting update unit 52 may also acquire the print data from the management server 12 or one of the external servers 18a-18c. Also, the setting update unit 52 may change the location from which to acquire the print data, depending on the set role.

According to the printer settings set for the specific role, the display control unit 54 controls the operation of the display operation unit 44. The display control unit 54 displays a logo image set for the specific role on the start screen or menu screen of the printer 14 and displays the menu screen set for the specific role. The display control unit 54 also starts up an application set for the specific role and enables the use of the application.

Figure 4:
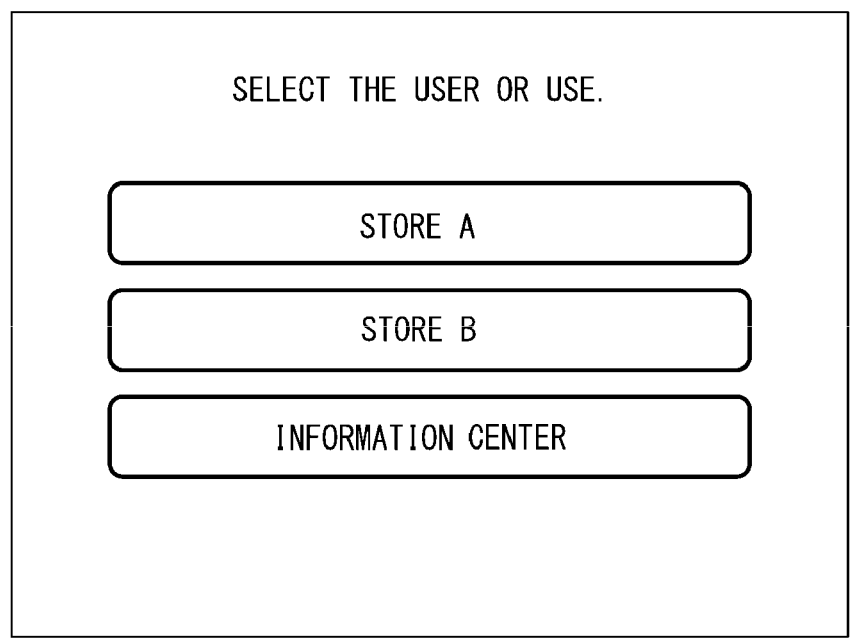
FIG. 4 is a diagram that schematically shows an example of a role selection screen displayed on a printer.

The display control unit 54 may display a role selection screen on which one of multiple roles is selected, when the printer 14 is started up, for example. FIG. 4 is a diagram that schematically shows an example of a role selection screen displayed on the printer 14. In FIG. 4, the store A corresponding to the first area 101, the store B corresponding to the second area 102, and the information center corresponding to the third area 103 in FIG. 2 are displayed as options. On the role selection screen, only a limited number of roles set for the position of the printer 14 are displayed as options. Also, only a single role may be displayed as an option on the role selection screen.

Figure 5:
FIG. 5 is a diagram that schematically shows an example of a setting update screen displayed on the printer.

While the printer settings are updated, the display control unit 54 may display a screen indicating that the settings are being updated. FIG. 5 is a diagram that schematically shows an example of a setting update screen displayed on the printer 14. FIG. 5 shows an example of a screen indicating that the printer settings are being updated to those for the store A, on which the updated role and the progress of the setting process are displayed. The screen shown in FIG. 5 may be displayed, for example, after the store A is selected on the screen shown in FIG. 4. When the setting of the printer is completed and the printer 14 is restarted, the display control unit 54 may display the start screen or menu screen for the role set after the restart. In the case of the example of FIG. 5, the logo image of the store A may be displayed at the time of startup.

At the start of operation corresponding to a specific role, the display control unit 54 may display a screen requesting user authentication. In the case of the example of FIG. 5, a message such as "Please hold up the user card of store A" may be displayed. When a user for whom the specific role is available logs in, the display control unit 54 may display a menu screen set for the specific role and enable menu operations set for the specific role. When a user for whom the specific role is available does not log in, the display control unit 54 may disable the operations on the menu screen set for the specific role.

The print control unit 56 controls the operation of the printing mechanism 46 according to the printer settings set for the specific role. When an operation for executing printing is performed through the display operation unit 44, the print control unit 56 allows the printing mechanism 46 to operate based on the print data associated with the specific role stored in the storage unit 48.

Figure 6:
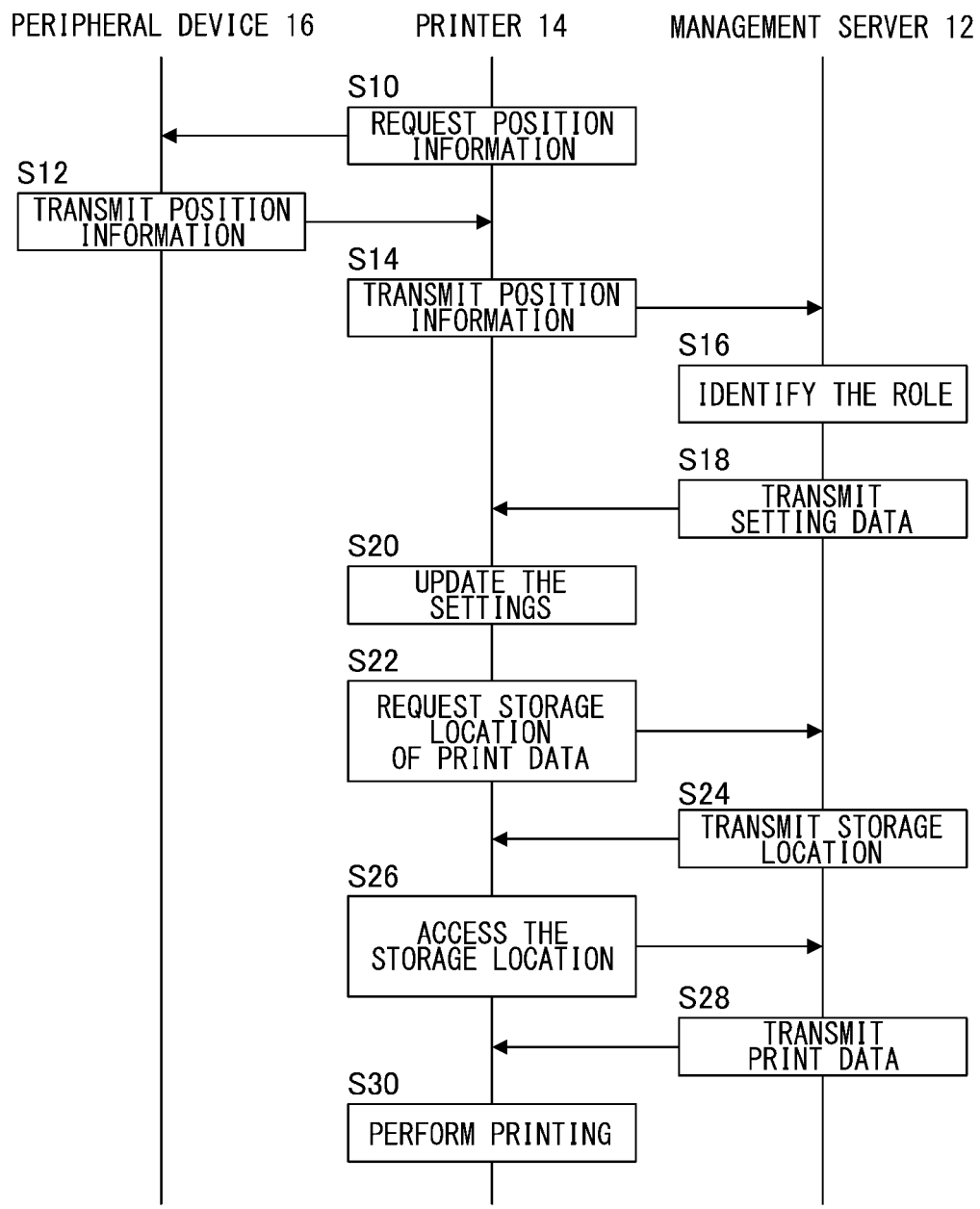
FIG. 6 is a sequential diagram that shows an example of the operation performed by the printer system.

There will now be described the flow of operation performed by the printer system 10. FIG. 6 is a sequential diagram that shows an example of the operation performed by the printer system 10. The printer 14 requests position information from the peripheral device 16 (S10). The peripheral device 16 transmits the position information to the printer 14 (S12). When the printer 14 includes a GPS device or the like, the printer 14 may measure its own position. The printer 14 transmits the position information of the printer 14 to the management server 12 (S14). The management server 12 identifies the role of the printer 14 based on the acquired position information (S16) and transmits setting data associated with the role to the printer 14 (S18). The printer 14 updates the printer settings based on the acquired setting data (S20).

The printer 14 requests, from the management server 12, information indicating the storage location of the print data associated with the role (S22). The management server 12 transmits the information indicating the storage location of the print data associated with the role (S24). The printer 14 accesses the storage location provided by the management server 12 (S26). In the example of FIG. 6, the storage location of the print data is the management server 12, so that the printer 14 accesses the management server 12. The management server 12 as the storage location transmits the print data to the printer 14 (S28). When the storage location is one of the external servers 18*a*-18*c*, the printer 14 accesses the one of the external servers 18*a*-18*c* at S26. In this case, at S28, the one of the external servers 18*a*-18*c* as the storage location transmits the print data to the printer 14. Thereafter, the printer 14 performs printing using the acquired print data (S30).

Figure 7:
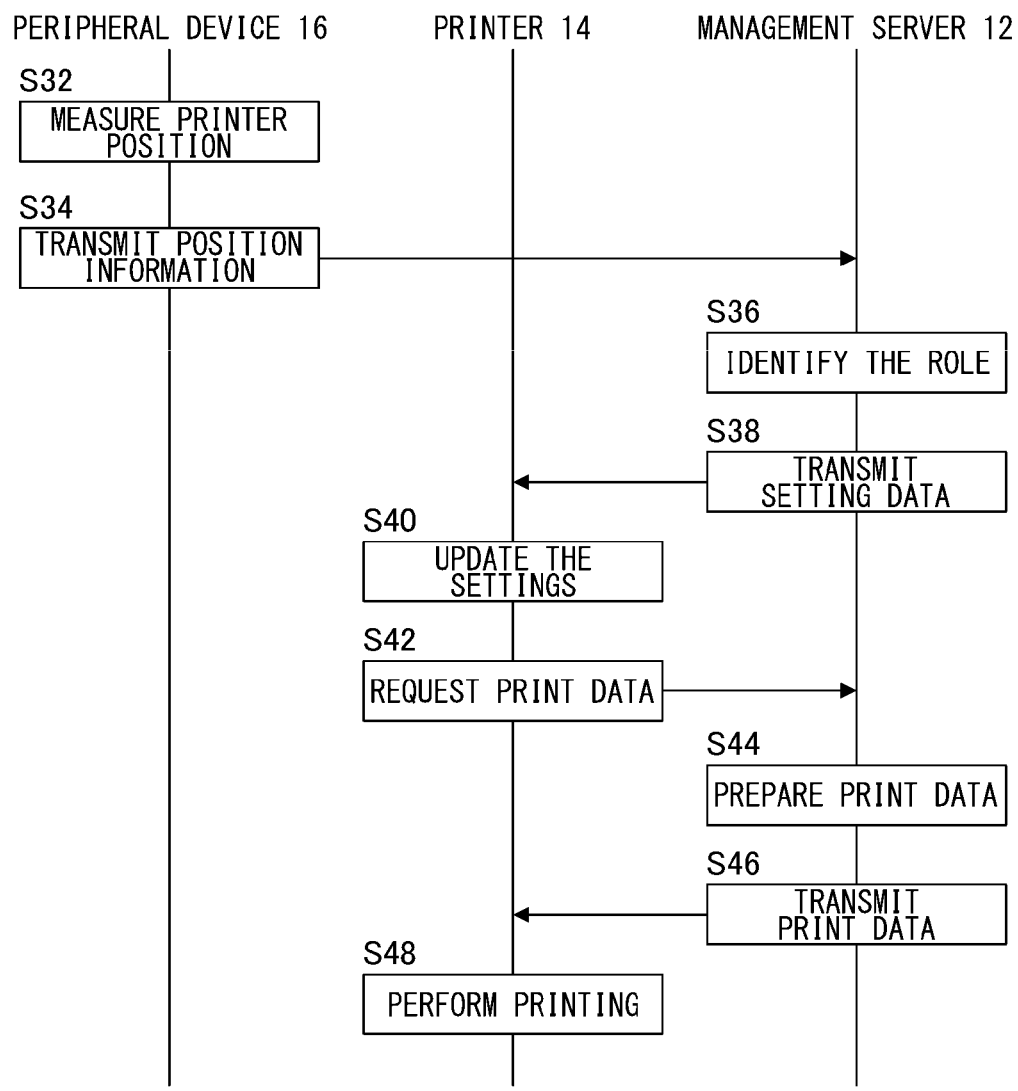
FIG. 7 is a sequential diagram that shows another example of the operation performed by the printer system.

FIG. 7 is a sequential diagram that shows another example of the operation performed by the printer system 10. FIG. 7 differs from FIG. 6 in the route of acquiring the position information and the method of acquiring the print data. The peripheral device 16 measures the position of the printer 14 (S32) and transmits the position information of the printer 14 to the management server 12 (S34). The management server 12 identifies the role of the printer 14 based on the acquired position information (S36) and transmits setting data associated with the role to the printer 14 (S38). The printer 14 updates the printer settings based on the acquired setting data (S40).

The printer 14 requests print data associated with the role from the management server 12 (S42). The management server 12 prepares the print data associated with the role (S44) and transmits the print data to the printer 14 (S46). At S44, the management server 12 may generate the print data based on the print information 34 that the management server 12 stores. Also, at S44, the management server 12 may acquire the print data from one of the external servers 18*a*-18*c*. Thereafter, the printer 14 performs printing using the acquired print data (S48).

The operations shown in FIGS. 6 and 7 may be combined as appropriate. The management server 12 may only use the position information acquired from the printer 14, as shown in FIG. 6, or may only use the position information acquired from the peripheral device 16, as shown in FIG. 7. The management server 12 may also use both the position information acquired from the printer 14 and the position information acquired from the peripheral device 16. Using these pieces of position information comprehensively, the management server 12 may identify the position of the printer 14, identify the area where the printer 14 is located, and identify the role of the printer 14. Also, the print data may be acquired by the printer 14 accessing the storage location thereof, as shown in FIG. 6, or may be prepared by the management server 12 and provided to the printer 14, as shown in FIG. 7.

According to the present embodiment, the role of the printer 14 can be automatically updated based on the location where the printer 14 is used. As a result, there is no need to set up the printer 14 in advance considering the location where the printer 14 is used, so that the role of the printer 14 can be easily changed. Also, since the role of the printer 14 is automatically changed simply by moving the location of the printer 14, sharing the printer 14 in multiple locations is also possible. Even if there is a shortage or malfunction of the printer 14, the problem can be solved simply by bringing a spare printer 14 or another printer 14 used in another store.

The printer 14 according to the present embodiment may be mounted and used on a self-supporting transport robot or the like. In this case, the role of the printer 14 can be automatically updated as the self-supporting transport robot moves to a location where the printer 14 is needed, thereby providing a function required at the location.

The present invention has been described with reference to an embodiment. It should be understood by those skilled in the art that the invention is not limited to the above-described embodiment and that various modifications could be developed on the basis of various design modifications and such modifications also fall within the scope of the present invention.

The aforementioned embodiment describes the case where only one role is set for one area or sub-area. In another embodiment, multiple roles may be set for one area or sub-area. In this case, the printer 14 may be configured to select one of the multiple roles.

The aforementioned embodiment describes the case where the areas are set not to overlap each other. In another embodiment, multiple areas may be set to overlap each other. In this case, in a place where multiple areas overlap, multiple roles set for the multiple areas may be identified. For example, a large area that covers the entire facility may be set, and a role as the facility, rather than roles as individual stores, may be assigned thereto. In this case, a printer located in an area corresponding to an individual store may be configured to select either the role as the individual store or the role as the facility.

In another embodiment, some of the functions provided by the management server 12 may be provided by another independent server. For example, the management server 12 may provide the functions of the role management unit 22, the setting management unit 24, and the print management unit 26, and a position management server different from the management server 12 may provide the function of the position management unit 20. In this case, the position management server may transmit the position information of the printer 14 to the management server 12. The management server 12 may acquire the position information of the printer 14 from the position management server, identify the role set for the position, and transmit the information associated with the role to the printer 14.

Showing example functional blocks, the aforementioned embodiment describes various functions provided by the server and the relationships among the various functions. The boundaries of the functional blocks described above are arbitrarily determined for convenience of explanation, and, as long as the various functions and the relationships among the various functions are appropriately realized, boundaries different from those of the abovementioned functional blocks may be determined. Also, the various functions provided by the server may be implemented by a single server device or may be implemented by coordination of multiple server devices. Therefore, a specific server providing a specific function includes the case where the specific function is implemented by a single server device and the case where the specific function is implemented by multiple server devices, and it does not necessarily mean that the specific function must be implemented only by the specific server.

What is claimed is:

1. A printer system, comprising:
  a server that acquires position information of a printer and identifies a printer's role set for the position of the printer based on the acquired position information; and
  a printer that acquires information associated with a printer's role identified by the server and operates based on the acquired information, wherein
  the server identifies a storage location of print data associated with the identified printer's role, and
  the printer acquires print data stored in the identified storage location and performs printing based on the acquired print data.

2. The printer system according to claim 1, wherein
  the server transmits, to the printer, setting data associated with the identified printer's role, and
  the printer updates printer settings based on setting data acquired from the server.

3. The printer system according to claim 1, wherein the server acquires position information from the printer.

4. The printer system according to claim 1, wherein the server acquires position information measured by a device present around the printer.

5. The printer system according to claim 1, wherein the server identifies, based on area information that defines a printer's role for each area, an area where the printer is located and also identifies a printer's role set for the identified area.

6. The printer system according to claim 1, wherein
  the printer transmits, to the server, user information used to identify a user who operates the printer, and
  the server identifies the printer's role based on the position information of the printer and the user information acquired from the printer.

7. A printer system, comprising:
  a server that acquires position information of a printer and identifies a printer's role set for the position of the printer based on the acquired position information; and
  a printer that acquires information associated with a printer's role identified by the server and operates based on the acquired information, wherein
  the server identifies, based on area information that defines a printer's role for each area, an area where the printer is located and also identifies a printer's role set for the identified area,
  the area information includes height information, and a different printer's role can be set for each height, and
  the server identifies, based on acquired position information, the height at which the printer is located and also identifies a printer's role set for the identified height.

8. A printer system, comprising:
  a server that acquires position information of a printer and identifies a printer's role set for the position of the printer based on the acquired position information; and
  a printer that acquires information associated with a printer's role identified by the server and operates based on the acquired information, wherein
  the server identifies, based on area information that defines a printer's role for each area, an area where the printer is located and also identifies a printer's role set for the identified area, and
  the server detects a change in the area where the printer is located based on the position information of the printer and transmits, upon detection of a change in the area where the printer is located, information associated with a printer's role set for the area after the change, to the printer.

9. The printer system according to claim 8, wherein, upon detection of a change in the area where the printer is located, the server transmits, to the printer, at least one of an instruction for disabling operation of the printer corresponding to the printer's role set for the area before the change or an instruction for enabling operation of the printer corresponding to the printer's role set for the area after the change.

10. A printer system, comprising:
  a server that acquires position information of a printer and identifies a printer's role set for the position of the printer based on the acquired position information; and
  a printer that acquires information associated with a printer's role identified by the server and operates based on the acquired information, wherein
  the server identifies, based on area information that defines a printer's role for each area, an area where the printer is located and also identifies a printer's role set for the identified area, and the server transmits to the printer a plurality of pieces of information associated with a plurality of printer's roles, including a printer's role set for the area where the printer is located, and a printer's role set for another area located around the area where the printer is located.

11. The printer system according to claim 5, wherein, when a plurality of printer's roles are set for the area where the printer is located, the server transmits, to the printer, a plurality of pieces of information associated with the plurality of printer's roles set for the area where the printer is located.

12. The printer system according to claim 10, wherein, when the printer has acquired from the server a plurality of pieces of information associated with a plurality of printer's roles, the printer displays an operation screen on which a user selects one of the plurality of printer's roles.

13. A printer system, comprising:
a server that acquires position information of a printer and identifies a printer's role set for the position of the printer based on the acquired position information; and
a printer that acquires information associated with a printer's role identified by the server and operates based on the acquired information, wherein
the printer transmits, to the server, user information used to identify a user who operates the printer, and
the server judges whether or not the user can use the identified printer's role, based on the user information acquired from the printer and authentication information that defines, for each printer's role, a user who can use the printer's role, and the server transmits an instruction based on the judgment to the printer.

14. A non-transitory program recording medium comprising a program causing a computer to implement:
acquiring position information of a printer;
identifying a printer's role set for the position of the printer based on the acquired position information;
identifying a storage location of print data associated with the identified printer's role; and
transmitting, to the printer, information that specifies the storage location of the print data associated with the identified printer's role.

15. A non-transitory program recording medium comprising a program causing a computer to:
acquire position information of a printer;
identify, based on the acquired position information and area information that defines a role of the printer for each area, an area where the printer is located;
identifying, based on the acquired position information, a height at which the printer is located;
identifying a role of the printer set for the identified height of the printer based on height information included in the area information, where a different role of the printer can be set for each height; and
transmitting, to the printer, information associated with the identified role of the printer.

16. A non-transitory program recording medium comprising a program causing a computer to:
acquire position information of a printer;
identify, based on the acquired position information and area information that defines a role of the printer for each area, an area where the printer is located;
detect a change in the area where the printer is located based on the position information of the printer;
identify a role of the printer set for the position of the printer based on the acquired position information; and
transmit, to the printer upon detection of a change in the area where the printer is located, information associated with the identified role of the printer set for the area after the change.

17. A non-transitory program recording medium comprising a program causing a computer to:
acquire position information of a printer;
identify, based on the acquired position information and area information that defines a role of the printer for each area, an area where the printer is located;
identify a plurality of roles of the printer including a role set for the area where the printer is located, and another role set for another area located around the area where the printer is located; and
transmit, to the printer, a plurality of pieces of information associated with the identified plurality of roles of the printer.

18. A non-transitory program recording medium comprising a program causing a computer to:
acquire position information of a printer;
identify a role of the printer set for a position of the printer based on the acquired position information;
transmit, to the printer, information associated with the identified role of the printer;
acquire user information used to identify a user who operates the printer;
judge whether or not the user can use the identified role of the printer, based on the user information acquired from the printer and authentication information that defines, for each role of the printer, a user who can use the role of the printer; and
transmit, to the printer, an instruction based on the judgment.

* * * * *